United States Patent [19]

Desvignes et al.

[11] Patent Number: 4,925,902

[45] Date of Patent: May 15, 1990

[54] COPOLYMERS OF PROPYLENE AND BUT-1-ENE AND USES THEREOF

[75] Inventors: Bernard Desvignes; Daniel Durand; Bernard Milleliri, all of Martigues, France

[73] Assignee: BP Chemicals Limited, London, England

[21] Appl. No.: 328,725

[22] Filed: Mar. 23, 1989

Related U.S. Application Data

[60] Continuation of Ser. No. 206,989, Jun. 10, 1988, abandoned, which is a continuation of Ser. No. 905,832, Sep. 10, 1986, abandoned, which is a division of Ser. No. 799,206, Nov. 19, 1985, Pat. No. 4,663,238, which is a continuation of Ser. No. 475,449, Mar. 15, 1983, Pat. No. 4,604,412, which is a continuation of Ser. No. 280,380, Jul. 6, 1981, abandoned, which is a continuation of Ser. No. 108,845, Dec. 31, 1979, abandoned.

[30] Foreign Application Priority Data

Jan. 17, 1979 [FR]  France ................................. 79 01123
Jul. 30, 1979 [FR]  France ................................. 79 19519

[51] Int. Cl.$^5$ .......................... C08F 2/00; C08F 10/04; C08F 10/14
[52] U.S. Cl. ...................................... 526/87; 526/142; 526/159; 526/348.6
[58] Field of Search ............... 526/87, 142, 159, 348.6

[56] References Cited

U.S. PATENT DOCUMENTS 3,923,758 12/1975 Carter .............................. 526/348.6
4,168,361  9/1979 Oda .................................. 526/348.6
4,360,650 11/1982 Desvignes ....................... 526/348.6
4,367,322  1/1983 Shiga .............................. 526/348.6

FOREIGN PATENT DOCUMENTS 1018341  1/1966 United Kingdom .
1452424 10/1976 United Kingdom .

Primary Examiner—Paul R. Michl
Assistant Examiner—Patrick A. Doody
Attorney, Agent, or Firm—Brooks Haidt Haffner & Delahunty

[57] ABSTRACT

The invention concerns copolymers of propylene and but-1-ene in which the proportion of units derived from but-1-ene is from 10 to 40% by weight and the proportion of isolated ethyl branches which they contain is at least equal to the square of the proportion [P] of units derived from propylene contained in said copolymers. The copolymers of the invention can be used for the production of heat-sealable films.

4 Claims, No Drawings

COPOLYMERS OF PROPYLENE AND BUT-1-ENE AND USES THEREOF

This application is a continuation of application Ser. No. 07/206,989, filed Jun. 10, 1988 now abandoned, which is a continuation of application Ser. No. 905,832, filed Sept. 10, 1986 abandoned, which is a division of application Ser. No. 06/799,206, filed Nov. 19, 1985 U.S. Pat. No. 4,663,238 which is a CON of 06/475,449 filed Mar. 15, 1983 U.S. Pat. No. 4,604,412 which is a CON of 06/280,380 filed Jul. 6, 1981 abandoned which is a CON of 06/108,845 filed Dec. 31, 1979, now abandoned.

The present invention relates to copolymers of propylene and but-1-ene which are capable in particular of being used for the production of heat-sealable films.

It has previously been proposed that copolymers of propylene and but-1-ene, of essentially crystalline nature, may be used for various purposes such as adhesives. These copolymers are produced by simultaneous copolymerization of the two olefins, in the presence of a catalytic system comprising a compound of a transition metal and an organo-metallic compound. In order to produce a copolymer of essentially crystalline nature, the catalytic system selected, in most cases, comprises a titanium trichloride and an organo-aluminum compound; for the same purpose, it is possible for an electron-donor compound, in particular hexamethylenephosphorotriamide (often referred to by the abbreviation; HMPT) to be added to the catalytic system.

French Pat. No. 1 359 276 and corresponding British Pat. No. 1 018 341 describe the preparation of copolymers of propylene and but-1-ene of the above-indicated type, and the use thereof for producing heat-sealable films. Such films comprise a thermoplastic material such as isotactic polypropylene, at least one of the faces of which is covered with a thin layer of propylene and but-1-ene copolymer of essentially crystalline nature. Such films may be sealed to themselves or to another film of polypropylene by heating to between about 100° and 130° C. In this use, the preferred copolymers are produced by copolymerization of a mixture of propylene and but-1-ene containing from 25 to 80 molar % of the latter olefin, in contact with a stereospecific catalytic system, that is to say, a catalytic system which, by polymerization of the propylene alone, results in a highly stereospecific polypropylene.

French patent application No. 2 265 540 and corresponding British Pat. No. 1 452 424 concern heat-sealable films of the above-indicated type, wherein the copolymer comprising propylene and another olefin, such as but-1-ene, would probably comprise sequences or blocks formed by chains of the same olefin. The manner of manufacture of these copolymers is not described in detail; it appears, however, from the examples, that polymerization is begun and terminated with propylene alone. According to these patents, the preferred copolymers contain from 5 to 20% by weight and more precisely from 10 to 15% by weight of olefin other than propylene, such as but-1-ene. The presence in these copolymers of the above-mentioned sequences or blocks is a priori capable of reinforcing the crystalline character of the latter.

The films which are covered with such a copolymer may be sealed at relatively low temperatures, close to 110° C., but they also suffer from a very serious disadvantage.

In fact, in practice, it is important for the sealed part of the heat-sealable films to provide fairly substantial mechanical strength as soon as the seal has been made, without the necessity to allow the seal to cool completely. This property, which is referred to as the hot seal strength or "hot tack", makes it possible to use the sealed materials immediately. The heat-sealable films produced from the copolymers described in French patent application No. 2 265 540 and the corresponding British patent are virtually devoid of this property of hot seal strength. It has been found in this respect that the thickness of the layer of copolymer has an influence on the strength of the seal, both in the hot and in the cold condition, and that the least unfavorable compromise was achieved when the copolymer thicknesses were from 0.19 to 0.36 microns, without being really satisfactory. It should also be emphasized that it is an extremely delicate operation to produce heat-sealable films which comprise a copolymer layer whose thickness is constant and as small as that referred to above.

In an attempt to overcome the above-indicated disadvantages, French patent application No. 2 314 211 and corresponding British Pat. No. 1 495 776 propose mixing with the copolymer comprising propylene and another olefin, a polymer of an olefin comprising from 4 to 10 carbon atoms or a copolymer containing at least 90% by weight of an olefin comprising from 4 to 10 carbon atoms. In practice, the heat-sealing layer comprises a mixture of a copolymer of propylene and but-1-ene, which is identical to that described in French patent application No. 2 265 540, and polybut-1-ene. These mixtures contain from 29% to 92% by weight of units derived from but-1-ene. It is then found, with mixtures containing a total of 34% and 50% by weight of but-1-ene, that the above-mentioned compromise, as between hot strength and cold strength of the seal, is slightly more satisfactory than with the copolymer alone; however, the advantageous thickness of the layers of mixture is still less than 0.36 micron. When the thickness of the layers is greater, hot strength is considerably reduced.

It has been found that copolymers of propylene and but-1-ene can be produced whose structure is different from that of the above-described copolymers. These copolymers can be used in particular for the production of heat-sealable films which make it possible to produce seals which are of satisfactory strength, both in the hot and in the cold condition.

The invention concerns copolymers of propylene and but-1-ene, wherein the proportion by weight of units derived from but-1-ene, said proportion being denoted by the symbol (Bu), is from 10 to 40% and whose structure is such that the ratio denoted by the symbol 'PRE', of isolated ethyl branches with respect to the total of the ethyl branches of the copolymer, is at least equal to the square of the proportion of links derived from propylene [P] which are contained in the copolymers. This is expressed by the relationship: $PRE > [P]^2$.

The proportion by weight of units derived from but-1-ene (Bu) in the copolymer is measured by spectrophotometry in the infra-red range, on the basis of absorption at wavelength $\lambda = 13.05\mu$ (microns). This measurement is carried out on a film of copolymer which is from 0.2 to 1 mm in thickness. The value of (Bu) is given by the relationship:

$$(Bu)\ \% = 13\ \frac{\text{Optical density at 13.05}}{\text{Thickness of the film in mm}}$$

The optical density at 13.05μ is equal to $$\log_{10} \frac{I_o}{I_t},$$

$I_o$ being the intensity of the incident light, $I_t$ being the intensity of the transmitted light and $\log_{10}$ being the decimal logarithm.

The proportion of propylene-derived links [P] is deduced by calculation from the measured value of (Bu).

The ratio 'PRE' of isolated ethyl branches relative to the total of ethyl branches of the copolymer is linked to the distribution of the links derived from but-1-ene in the macromolecular chain of the copolymers. In fact, the copolymers of propylene and but-1-ene comprise a chain of carbon atoms on which there are fixed hydrogen atoms and also methyl radicals, originating from propylene molecules and ethyl radicals, originating from molecules of but-1-ene. When two or more links derived from but-1-ene are disposed in succession in the macromolecular chain, the branches formed by the corresponding ethyl radicals are said to be adjacent. In contrast, when a link derived from but-1-ene is isolated between propylene-derived links, the corresponding ethyl branch is said to be isolated. The ratio 'PRE', which is suitably measured by analysis of a sample of copolymer by nuclear magnetic resonance of carbon 13, referred to as 'NMR$^{13}$C', consequently sets forth the proportion, in the macromolecular chains, of links derived from but-1-ene, which are isolated between two propylene links, with respect to the total of links derived from but-1-ene. According to the theories relating to the kinetics of polymerization, the expression PRE=[P]$^2$ corresponds to a good degree of dispersion in the macromolecular chain of the links derived from but-1-ene, in accordance with the facts experimentally observed by G. Natta et al (Journal of Polymer Science, Vol 51, page 429, 1961) whereby the speeds of reaction of propylene and but-1-ene are substantially independent of the terminal structure of the polymer chain being grown.

Moreover, study of the copolymers of the invention by the above-mentioned NMR$^{13}$C method shows that the propylene-derived links form part of sequences of isotactic polypropylene, in which the methyl branches are consequently oriented in the same manner. However, these sequences are too short to permit the copolymer, in the solid state, to take up a properly ordered spatial arrangement. It is found in fact that the copolymers of the invention have fusion enthalpy which is equal to or less than 15 cal/g, said enthalpy in most cases being from 5 to 12 cal/g under the measurement conditions set forth in Example 1.

The fusion enthalpy of the copolymer corresponds to the amount of heat required to melt one gram of copolymer. This amount of heat is linked to the spatial arrangement of the copolymer as that amount of heat increases in proportion to greater order in the structure of the polymer. Thus, fusion enthalpy of isotactic polypropylene, which has a regular spatial arrangement, is at least 30 cal/g. Therefore, by reference to the fusion enthalpy of isotactic polypropylene, it is possible to determine the degree of regularity of the spatial arrangement of the copolymers of the invention and consequently their relative crystallinity. The relative crystallinity of the copolymers of the invention may also be evaluated by X-ray diffraction but the results obtained by this method are rather arbitrary as they suffer from severe variations depending on the method used for decomposing the diffraction spectrum into an amorphous region and a crystalline region.

It has also been found that copolymers of propylene and but-1-ene, in which the proportion by weight of units derived from but-1-ene is from 30 to 40%, more particularly from 30 to 35%, make it possible to produce heat-sealable films whose qualities are at least as good as copolymers with a smaller proportion of units derived from but-1-ene. This discovery is surprising. In fact, when the proportion of but-1-ene increases in the polymerization medium, the probability of polymerizing successively two or more molecules of but-1-ene rises, which causes a reduction in the 'PRE'. As the properties of the copolymer are linked to the ratio 'PRE', it could have been expected that the properties of the copolymers which contain more than 30% by weight of units derived from but-1-ene would not be as good than those of copolymers wherein the proportion of units derived from but-1-ene is from 10 to 30% by weight.

The copolymers, according to the invention, are advantageously prepared by copolymerization of propylene and but-1-ene in the presence of a catalytic system comprising a titanium trichloride-base catalyst and, as a co-catalyst, one or more organo-metallic compounds of metals of groups II and III of the periodic table of elements.

Polymerization is generally effected at a pressure below 40 bars and at a temperature which is from 40° to 150° C. and preferably from 50° to 80° C. This operation may be carried out by bringing together the monomers comprising propylene, but-1-ene and the constituents of the catalytic system, with or without a liquid diluent comprising for example liquid comonomers and/or a saturated aliphatic hydrocarbon. Polymerization can also be effected in the presence of a chain-growth limiter, generally hydrogen, whose proportion with respect to the olefins in the polymerization medium is from 1 to 20 molar %, so as to produce a polymer which has the desired fluidity index.

Titanium trichloride-base catalysts which can be used in the production of the copolymers of the invention are selected from the stereospecific catalysts which are used in the manufacture of isotactic polypropylene. Such catalysts are generally produced by reduction of titanium tetrachloride by means of hydrogen, aluminum, an aluminum hydride or an organo-aluminum compound such as alkylaluminum chloride. Generally, preparation of such catalysts comprises or is followed by a treatment at a temperature of from 100° to 160° C., in order to produce the titanium trichloride in the gamma crystallographic form. Preparation of the catalyst advantageously includes or is followed by a treatment by an electron-donor compound, such as an aliphatic ether; this second treatment makes it possible to increase both stereospecificity and activity of the catalyst.

The organo-metallic compound or compounds of a metal of groups II and III of the periodic table, which are used as co-catalyst, preferably comprise organo-aluminum compounds having the mean formula AlR'$_x$Z$_{(3-x)}$, wherein R' represents an alkyl group containing from 2 to 12 carbon atoms, Z represents a hydrogen atom or a halogen, such as chlorine or bromine, and x is an integer or a fraction which can be of any value from 1 to 3. These compounds are preferably selected from dialkylaluminum chlorides having the formula ClAlR'$_2$, wherein R' is an alkyl group containing from 2 to 12 carbon atoms, more particularly diethylaluminum chloride. These compounds are advantageously used in amounts such that the ratio between the number of atoms of metal of groups II and III of the co-catalyst and the number of atoms of titanium in the catalyst is from 1 to 50.

The constituents of the catalytic system may be used in different ways.

The catalyst may be introduced into the polymerization reactor directly or in the form of a pre-polymer produced by preliminary polymerization of propylene alone or a mixture of propylene and but-1-ene, within an inert liquid diluent and in the presence of a catalytic system, as defined above. In order to produce the pre-polymer, it is sufficient to polymerize from 10 to 100 moles of propylene or propylene and but-1-ene per mole of TiCl$_3$ of the catalyst.

The organo-metallic compound or compounds of a metal of groups II and III of the periodic table can also be directly introduced into the polymerization reaction vessel. These compounds can also be used in the form of a porous carrier which has first been impregnated with such compounds; in this case, the porous carrier may be an inert, organic or inorganic carrier or may comprise the pre-polymer referred to in the previous paragraph.

In order to produce copolymers having the above-indicated characteristics, it is important for the ratio between the amounts of propylene and but-1-ene contained in the polymerization medium to be maintained at a substantially constant value throughout the polymerization operation. The above-indicated ratio is selected on the one hand in accordance with the proportion of but-1-ene in the copolymer to be produced and on the other hand in accordance with the catalytic systems used. This ratio is determined experimentally.

In accordance with a preferred method of producing the copolymers of the invention, the ratio between the amounts of propylene and but-1-ene is maintained substantially constant during polymerization by means of a device comprising on the one hand an analyzer for measuring the ratio between the concentration in respect of propylene and the concentration in respect of but-1-ene in the polymerization reaction vessel and on the other hand means for introducing propylene and but-1-ene into the reaction vessel, said means being controlled in dependence on each other and on the analyzer. An embodiment of this device is described hereinafter in the polymerization type example.

The copolymers of the invention can be used for the production of heat-sealable films comprising a film of thermoplastic material, such as isotactic polypropylene, which is covered on one face at least by a layer of said copolymer. The polypropylene film which is usually from 5 microns to 1 mm in thickness, and in most cases from 10 to 100 microns in thickness, may be produced in accordance with any known means, for example, extrusion. In order to increase the transparency of the film and to improve its mechanical properties, the film is usually subjected to double drawing in the direction of its width and in the direction of its length, and also to stabilization at a temperature of from 100° to 150° C.

The copolymer of the invention may be applied to the film which has already been formed, for example, using the method of extrusion coating which comprises extruding the molten copolymer on to the previously formed film. It is also possible to use co-extrusion of the film and the layer or layers of the copolymer; this operation may be performed by means of an extrusion machine wherein the thermoplastic material which is intended to form the film, on the one hand, and the copolymer, on the other hand, are passed into a die in the molten state in such a way that the copolymer layer is disposed on the surface of the film while it is being formed. The assembly is then drawn in the manner indicated above.

Using the copolymers of the invention, it is also possible to produce heat-sealable films wherein the copolymer layer or layers are from 0.1 to 10 microns, preferably from 0.5 to 5 microns in thickness, which films can be sealed to themselves in a sealing range which is in the region from 90° to 150° C. so that the resulting seal has satisfactory strength, both in the hot and in the cold condition. It is further noted that the films which are produced in this way enjoy excellent transparency and very good scratch resistance.

EXAMPLES

A. Example of production of a copolymer

The apparatus comprises a stainless steel polymerization reaction vessel which has a capacity of 16 liters and which is provided with an agitator and a heat control means providing for heat control by circulating a fluid in a double jacket. The upper part of the reaction vessel is connected to a chromatograph, with a sample of the gaseous atmosphere in the reaction vessel being passed into the chromatograph every ten minutes; the chromatograph communicates the result of the measurement operation to a memory-type computer which determins the molar ratio between the but-1-ene and the propylene. The propylene and the but-1-ene are introduced into the reaction vessel separately, each by way of a conduit provided with a servo-control tap controlled by the computer which determines the frequency at which and the period of time for which the taps are opened, so as to maintain the pressure obtaining in the reaction vessel and the molar ratio of but-1-ene to propylene, in conformity with the selected values.

After the reaction vessel has been purged by means of nitrogen, there are introduced 8 liters of n-heptane which is heated to 50° C., an amount of catalyst corresponding to 40 millimoles of TiCl$_3$ and 100 millimoles of diethylaluminum chloride. When the reaction vessel has been closed, hydrogen is introduced until the partial pressure in the reaction vessel is 1 bar, followed by propylene and but-1-ene in the selected molar ratio. The chromatograph and the computer are set in operation and polymerization is continued for 3 hours. The reaction vessel is degassed and its content is transferred to a 50 liter tank in which the content is stirred and in which the catalyst is killed by means of alcohol. The copolymer is then treated by washing and decantation, three times with 12 liters of n-heptane at a temperature of 50° C., and then twice by means of 20 liters of water. After drying, the copolymer is collected and analyzed.

B. Example of production of a heat-sealable film

A heat-sealable film is produced by means of a co-extrusion machine which is supplied on the one hand with isotactic polypropylene and on the other hand a copolymer according to the invention. The resulting film product comprises a film of polypropylene which is about 1.2 mm in thickness and which is covered on each of its faces with a layer of copolymer which is about 50 microns in thickness. The film is drawn about 5 times in the direction of its length at a temperature of 110° C., and then 10 times in the direction of its width at a temperature of 140° C. The resulting film is about 25 microns in thickness, the layers of copolymer each being about 1 micron in thickness.

The sealing threshold of the film is measured on a sample of film which is 38 mm wide. For this purpose, heat-sealing tests are carried out on the film by pressing together two samples of film which are disposed transversely between two flat rectangular jaws measuring 20 mm×50 mm to which a pressure of 1 kg/cm² is applied. The jaws are heated at different temperatures between 90° and 150° C. The cold strength of the seal is measured after cooling of the sealed film to 25° C.; it is expressed by the force in grams required to open the seal which is thus produced over a width of 38 mm. The sealing threshold is the temperature in respect of which the cold strength of the seal produced is equal to or higher than 300 g/38 mm. The hot strength of the seal is measured by means of a metal blade which is bent over on to itself, so that, when its ends touch, the blade applies an opening force of 45 g. A strip of the film which is 30 mm in width and whose length is greater than that of the blade is disposed over the blade on the outside thereof so that the layer of copolymer is towards the blade and the ends of the strip project beyond the ends of the blade. The blade and the film covering the blade are curved over and the two free ends of the film are pressed between two serrated jaws under a pressure of 35 kg/cm² at the selected temperature, for a period of 1 second, while the blade is held under tension. Just before the jaws are opened, the blade is released so that it applies an opening force of 45 g to the weld. The sample is admitted as satisfying the hot strength test of the weld at the selected temperature when the weld comes apart over a depth of less than 3 mm. In this way it is possible to determine the range of temperatures between the limit values of which the film satisfies the hot seal strength test. The jaws used measure 10 mm×200 mm. Their surface comprises a succession of contiguous notches or teeth which are parallel to the small side of the jaws. Their shape is in the form of an isosceles right-angled triangle positioned on its large side which measures 1.6 mm. When the jaws are closed, the teeth of the two jaws engage into each other. The jaws transversely grip the film over a surface area measuring 10 mm×30 mm.

The scratch resistance of the film is determined in the following manner: a sample of the film measuring 10 cm×20 cm is folded over onto itself to form a square measuring 10 cm×10 cm.

The square is vigorously rubbed between the hands, five times in each direction. The number and depth of the scratches are determined visually and the result is noted by comparison as being good, average or poor.

Examples 1 to 7 and comparative Example C

I. Using the process described in type Example A, copolymers with variable amounts of but-1-ene are prepared. The copolymer of comparative Example C is prepared in the same way except as regards the feed of but-1-ene which is in three equal fractions which are introduced at the beginning of polymerization, after 1 hour and after 2 hours.

The following parameters are measured on the resulting copolymers:
(a) Proportion by weight of but-1-ene (Bu) by absorption in the infra-red, from which the molar proportion of propylene [P] is deduced;
(b) Fluidity index under a pressure of 2 bars at 230° C. ($IF^2_{230}$), measured in accordance with the standard ASTM D 1238;
(c) Fusion enthalpy, by means of a Perkin-Elmer sweep differential microcalorimeter. The enthalpic graph of a sample of 5 mg of the copolymer is recorded by heating at 16° C./min up to a temperature of 200° C. (the sample is previously subjected to a heat treatment comprising heating at a gradient of 16° C./min up to 200° C., holding that temperature for 20 min, then cooling at a gradient of 16° C./min down to 50° C.). The recorded area is proportional to the enthalpy;
(d) The ratio PRE of isolated ethyl branches with respect to the total of ethyl branches, by nuclear magnetic resonance of carbon 13, by means of a Bruker WH 360 apparatus operating at 90.52 MHz for carbon $13_C$, on a solution of copolymer in orthodichlorobenzene at 120° C., and then tetramethylsilane as a reference. The area of two peaks is determined, one being peak $S_1$ at 42.8 ppm corresponding to the isolated ethyl branches and the other being peak $S_2$ at 39.7 ppm corresponding to the other ethyl branches. The ratio PRE is equal to $S_1 (S_1+S_2)$.

The ratio PRE is compared to $[P]^2$ to which it is always at least equal in respect of the copolymers of the invention, whereas it is markedly lower in respect of the copolymer of comparative Example C.

II. Films of heat-sealable polypropylene are prepared from the preceding copolymers, in accordance with type Example B. The sealing threshold and the hot seal strength range are measured on the films produced, in the manner indicated above.

The results which are shown in Table I show:
that the temperature of the sealing threshold progressively decreases in proportion as the proportion by weight of but-1-ene (Bu) in the copolymer rises;
that the hot seal strength range is already 25° to 30° C. in respect of copolymers containing from 10 to 15% by weight of but-1-ene (whereas this range is only 5° C. for the copolymer of comparative Example C);
that the hot weld strength range reaches 50° C. in respect of copolymers with a higher proportion of but-1-ene.

It will also be noted that the films produced enjoy a good level of scratch resistance, which is determined in the above-indicated manner, and excellent transparency as measured by means of a "Hazemeter" in accordance with standard ASTM D 1003-61.

Example 8

A heat sealable film is produced according to Example B, the co-extrusion machine being supplied on the one hand with a random copolymer of propylene and ethylene containing about 11% of units derived from ethylene and, on the other hand, with the propylene-but-1-ene copolymer of Example 6. The resulting film comprises a film of propylene-ethylene copolymer which is about 1.2 mm in thickness and which is covered on each of its faces with a layer of propylene-but- 1-ene copolymer which is about 50 microns in thickness.

The film is stretched according to type Example B, then subjected to the tests. The measured properties are:

| - sealing threshold: | | 116° C. |
|---|---|---|
| - hot strength of the seal | range: | 95–145° C. |
| | difference between range limits: | 50° C. |

TABLE I

| Example | 1 | 2 | 3 | 4 | 5 | 6 | 7 | C |
|---|---|---|---|---|---|---|---|---|
| COPOLYMER | | | | | | | | |
| (Bu) | 0.125 | 0.14 | 0.165 | 0.20 | 0.25 | 0.32 | 0.36 | 0.11 |
| $IF^2{}_{230}$ | 2 | 3.1 | 3 | 3 | 3.5 | 3 | 4 | 2.5 |
| Fusion enthalpy (cal/g) | 14.3 | 12 | 11 | 10 | 8 | 7 | 6 | 15 |
| [P] | 0.90 | 0.89 | 0.87 | 0.84 | 0.80 | 0.74 | 0.70 | 0.915 |
| $[P]^2$ | 0.81 | 0.795 | 0.76 | 0.705 | 0.64 | 0.55 | 0.49 | 0.835 |
| PRE | 0.85 | 0.88 | 0.84 | 0.72 | 0.68 | 0.59 | 0.50 | 0.60 |
| FILM | | | | | | | | |
| Sealing threshold (°C.) | 122 | 120 | 118 | 115 | 115 | 116 | 116 | 125 |
| Hot strength of the seal: | | | | | | | | |
| - range (°C.) | 115–140 | 112–140 | 100–145 | 95–145 | 95–145 | 93–145 | 90–145 | 135–140 |
| - difference between range limits (°C.) | 25 | 28 | 45 | 50 | 50 | 52 | 55 | 5 |

We claim:

1. A polymerization process for preparing copolymers of propylene and but-1-ene, wherein the proportion by weight of units derived from but-1-ene is from 10 to 40%, the proportion, denoted by the symbol "PRE" of isolated ethyl branches is at least equal to the square of the proportion (P) of units derived from propylene contained in said copolymers, and the fusion enthalpy measured after heat treatment of said copolymers is not more than 15 cal/g, said process being characterized in that the polymerization is carried out at a temperature of 50° C. to 80° C. by bringing into contact (1) a catalytic system comprising (i) a titanium trichloride-base catalyst in the gamma crystallographic form which is stereospecific in the polymerization of propylene alone and is prepared by reducing titanium tetrachloride by means of hydrogen, aluminum, an aluminum hydride or an organoaluminum compound, and by subjecting the reduced solid to a treatment at a temperature from 100° to 160° C. and to a treatment with an electron-donor compound, and (ii) one or more cocatalysts consisting of organoaluminum compounds having the mean formula $AlR'_xZ_{(3-x)}$ wherein $R'$ represents an alkyl group containing from 2 to 12 carbon atoms, Z represents a hydrogen or halogen atom and x is a integer or a fraction having any value from 1 to 3, in such amounts that the atomic ration of Al/Ti is from 1 to 50, with (2) a mixture of propylene and but-1-ene, in a liquid diluent comprising the liquid comonomers and/or a saturated aliphatic hydrocarbon, so that the ratio between the amounts of propylene and but-1-ene contained in the liquid polymerization medium is maintained at a constant value throughout the polymerization reaction.

2. A process as claimed in claim 1 wherein the ratio between the amounts of propylene and but-1-ene contained in the polymerization medium is kept constant during the polymerization operation by means of a device comprising an analyzer for measuring the ratio between the degrees of concentration in respect of propylene and but-1-ene in the polymerization medium and, means for introducing propylene and but-1-ene into the polymerization medium, said means being controlled in dependence on each other and on the analyzer.

3. A process as claimed in claim 1, characterized in that the cocatalyst consisting of organoaluminum compounds comprises dialkylaluminum chlorides having the formula $ClAlR'_2$, wherein $R'$ is an alkyl group containing from 2 to 12 carbon atoms.

4. A process as claimed in claim 3 wherein the organoaluminum compound is diethylaluminum chloride.

* * * * *